3,214,235
CROSSLINKED DERIVATIVES OF POLYHYDROXY COMPOUNDS AND AN ESTER OF PROPIOLIC ACID
George L. Wesp, Englewood, and Lee A. Miller, Dayton, Ohio, assignors to Monsanto Company, a corporation of Delaware
No Drawing. Filed Mar. 17, 1961, Ser. No. 96,384
11 Claims. (Cl. 8—120)

This invention relates to derivatives of polyhydroxy compounds and more particularly provides new and valuable cross-linked addition products of an aliphatic polyol having at least three hydroxy groups and certain acetylenic esters.

According to the invention, aliphatic polyols having at least three hydroxy groups and containing only carbon, hydrogen and oxygen, which compounds may be monomeric or polymeric, are converted to yield a new class of products having utility in various chemical and related industries by reacting them with an ester of propiolic acid of the formula

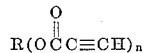

where R is selected from the class consisting of paraffinic, aromatic, and paraffinic-aromatic hydrocarbon radicals of from 2 to 18 carbon atoms and alkyleneoxyalkylene and polyalkyleneoxyalkylene radicals having from 2 to 4 carbon atoms in the chain of the alkylene radical and a total of from 2 to 6 carbon atoms in the alkylene radical, a total of from 1 to 100 oxygen atoms and a total of from 2 to 101 alkylene radicals, said R being linked through diverse carbon atoms thereof to the remainder of the molecule of which it forms a part, and $n$ is a number of 2 to 4. Esters of the above formula are disclosed in the copending application of Lee A. Miller and John M. Butler, Serial No. 38,113, filed June 23, 1960, now U.S. Patent 3,082,242. They are prepared by the esterification of one mole of the di-, tri- or tetrahydroxy compound $R(OH)_n$ wherein R and $n$ are as above defined, with propiolic acid or the acyl chloride or anhydride thereof.

Reaction of the polyol compound with the ester takes place by addition of a hydroxy radical of the polyol across the acetylenic bonds of the ester. The addition results in cross-linking; i.e., the ester adds to two or more different moles or polymer chains of the polyol through a hydroxy radical thereof, forming an ether-ester bridge between the different moles or chains at various portions of the carbon skeleton, reacting as follows in the case of the dipropiolates:

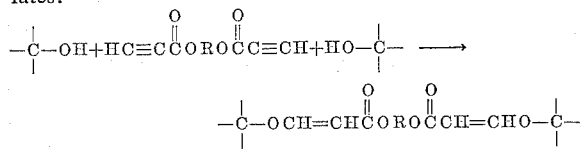

where the dangling valences depict the residue of the polyol.

Depending upon the quantity of available acetylenic ester and the nature of the polyol, the ester reacts more or less randomly at the hydroxy groups of the polyol to give structures having a plurality of bridges. One or all of the hydroxy radicals of the polyol can participate in the reaction, and the difference between the properties of the unreacted polyol and those of the cross-linked polyol will depend upon the number of bridges which have been introduced, i.e., on the extent of the reaction. Whereas total cross-linking of the polyol results in a product which no longer has the physical properties of the unreacted polyol, cross-linking at only a small portion of the hydroxy groups will often result only in partial modification.

The properties of the presently provided cross-linked polyols therefore vary with the extent of the bridging. Generally, the compounds of the invention range from viscous liquids to waxy or hard solids, depending upon the chain-length of the polyol and upon the extent of the presently-effected cross-linking. Whether or not cross-linking has occurred is generally evidenced by insolubility of the polyol; or, in the case of very light cross-linking, by transformation of the flow properties of solutions further away from Newtonian flow toward gel-like properties.

The presently provided cross-linked polyols may be prepared by causing the acetylenic ester to react with an aliphatic hydrocarbon polyol having at least three hydroxy groups to obtain the cross-linked polyol having the desired number of ether-ester linking bridges. Because the reaction occurs by addition, there is no formation of by-product and hence there is presented no problem of isolation and/or purification. The relative amounts of the reactants employed depend upon the nature of the polyol which is employed and on the extent of cross-linking that is desired. Thus, if two of the hydroxy groups of, say, glycerine are to be cross-linked by a dipropiolate, equimolar proportions of the reactants are employed, whereas if all of the hydroxy radicals are to be reacted there will be stoichiometrically required two moles of glycerine per three moles of the ester.

The present invention is particularly of interest in the modification of properties of high-molecular weight polyols such as the polysaccharides, e.g., cellulose, and the synthetic, polyhydroxylated polymers such as polyvinyl alcohol or partially hydrolyzed polyvinyl acetate. Here there is generally desired not a total change in physical appearance and other properties but an improvement of some characteristics for the purpose of fitting the polymeric material to a particular utility. In this case, the cellulosic material is caused to react with only a sufficient quantity of dipropiolate to react with from, say, 0.1% to 3.0% of the hydroxy groups. The cellulose-dipropiolate adduct thus obtained retains the same fibrous structure as that characterizing the original cellulosic material prior to reaction with the dipropiolate; but, as will be shown in the examples, there is evidenced a change in other properties of the cellulose. Similarly, by reaction of starch with the di- or polyfunctional esters a change in the normal characteristics of the starch is effected. Such modified starches are highly desirable as sizing agents, e.g., for papers and textile fabrics in that materials sized therewith are rendered substantially wash-proof and impermeable to dirt and inks and are enhanced in feel and texture. Also, the natural gums and resins of the carbohydrate class, e.g., gum arabic or pectin, are converted by reaction with the esters into cross-linked products having improved protective colloidal effects and adhesive properties. Also converted into products of improved utility by addition reaction with the di- or polypropiolates are the mono- and di-saccharides, e.g., glucose or sucrose.

Reaction of the di-, tri-, or tetra-propiolate with the polyol to give the presently provided cross-linked addition products is generally conducted in the presence of a basic catalyst, and an inert liquid diluent or solvent may be present. Preferably, the basic catalyst is organic. This is particularly desirable when the reaction is effected in the presence of a diluent. Examples of presently useful basic catalysts are, e.g., the heterocyclic nitrogen bases such as N-methylmorpholine, pyridine, quinoline, N-ethylpiperidine, picoline, quinalkine, 4-methylpyrimidine, or N-phenylpyrazole; the tertiary amines such as triethylamine, triamylamine, tri-tert-butylamine, N,N-dimethylaniline and N-benzyl-N-methylaniline; alkylene polyamines such as triethylenediamine; quaternary ammonium compounds such as benzyltrimethylammonium methoxide or tetrabutylammonium butoxide; alkali metal alkoxides such as sodium or potassium methoxide or propoxide, etc. The alkali metal hydroxides, e.g., sodium, potassium or lithium hydroxide are useful. The use of a diluent or solvent in the reaction will depend upon the nature of the reactants as well as upon the reaction conditions which are employed. When using a liquid dipropiolate a diluent need not be used unless the ester and/or the polyol are extremely reactive. In that case, the use of an inert diluent will serve to moderate the reaction. Since essentially all reactions of organic compounds are influenced with respect to relative rates and extent of reaction by structural variations in the reactants, in this case, too, adjustment of temperature and catalysis must be made to secure control of reaction time and extent of cross-linking. The quantity of the catalyst to be used also depends upon the nature of the cross-linking propiolate and of the polyol; obviously the more reactive reactants will require less catalyst than will the more sluggish reactants. Whether or not a diluent and the quantity thereof is used will likewise regulate catalyst quantity. Also variable is the temperature at which reaction is effected; for, here again must be taken into consideration the nature of the reactants, use of diluent and catalyst quantity. While some of the present addition cross-linking reactions can be conducted at ordinary room temperature or even at decreased temperatures, say, at −10° C. to 10° C., in other instances heating of the reaction mixture will be needed. With the polymeric polyols, which compounds are generally less reactive than are the monomeric polyols, reaction is usually completed by curing at temperatures of, say, from 60° C. to 160° C., polymers which are in contact with the cross-linking propiolate and basic catalyst. All of these variables, i.e., catalyst quantity, use of diluent and temperature conditions can readily be arrived at by easy experimentation.

In reacting solid polymeric polyols such as cellulose pulps, fibers, textile or paper, the material to be reacted may be immersed in or padded with a dilute solution of the di- or poly-propiolate in a solvent and the thus treated material cured in a chamber in the presence of vapors of the basic catalyst, say, N-methylmorpholine, at a temperature of from, say, 80° C. to 120° C. The cross-linking addition reaction is more economically and at least as effectively conducted by treating the cellulose material with an aqueous solution or with an aqueous emulsion containing from, say, 0.5% to 3.0% by weight of the propiolate. As emulsifier there may be present in the treating emulsion from, say, 0.02% to 0.2% by weight of an anionic or cationic emulsifier, e.g., sodium dodecyl- or tridecylbenzenesulfonate, dodecylphenol polyethylene glycol ether or mixtures thereof, etc. The basic catalyst may or may not be present in the aqueous emulsion in a quantity of, say, from 0.001% to 0.10%. If not present in the emulsion, the catalyst may be introduced in the vapor state, e.g., by passing air or nitrogen admixed with the volatilized catalyst over the polyol material after it has been padded with or immersed in the aqueous emulsion. Depending upon the nature and quantity of reactants and of the catalyst, the treated product may be submitted to a curing step in order to assure complete reaction. This may be effected by heating at a temperature of from, say, 50° to 160° C. for a time which will vary from only a minute or so to several hours, the shorter heating period being used at the higher temperatures. Usually, the monomer polyols are so reactive that the cross-linking reaction is completed without a terminal heating step.

Aliphatic polyols having at least three hydroxy groups are generally useful for the preparation of the presently provided cross-linked addition products. Thus, as the polyol component there may be employed, e.g., glycerol, 1,2,4-butanediol, 1,4,5-hexanetriol, erythritol, pentaerythritol, xylitol, arabitol, mannitol, sorbitol, dulcitol; the carbohydrates generally such as sucrose, dextrose, dl- glucose, fructose, galactose, arabinose, xylose, starches, cellulose, hydroxy-bearing cellulose esters, ethers or xanthates; high molecular weight hydroxy-containing synthetic polymers such as polyvinyl alcohol, partially hydrolyzed polyvinyl carboxylates such as polyvinyl acetate or polyvinyl formate, partially hydrolyzed copolymers of vinyl carboxylates and copolymerizable compounds such as vinyl acetate-vinyl chloride copolymer or vinyl acetate-ethylene copolymer, partially acetalized polyvinyl alcohol such as polyvinyl formal or polyvinyl butyral containing some hydroxy radicals, polyvinyloxyethanol or copolymers of vinyloxyethanol and a compound copolymerizable therewith such as vinyloxyethanolpropylene copolymer, etc.; the natural carbohydrate gums such as tragacanth, guar gum, locust bean gum, carrageenin, gum arabic, agar, pectin, ghatti, karaya, algin, etc.

The propiolates which are employed according to the invention for cross-linking the above polyols may be those of paraffinic, aromatic, paraffinic-aromatic, alkyleneoxyalkylene or polyalkyleneoxyalkylene diols, triols or tetraols. Particularly useful are the paraffinic dipropiolates, i.e., compounds of the formula

where X is an alkylene radical of from 2 to 18 carbon atoms which is linked through diverse carbon atoms thereof to the rest of the molecule of which it forms a part.

Examples of the presently useful paraffinic dipropiolates are those of ethylene glycol, 1,2- or 1,3-propanediol, 1,2-, 1,3-, 1,4-, or 2,3-butanediol, 1,3-, 1,4-, 1,5-, 2,3-, or 2,4-pentanediol, 2-methyl-1,5-pentanediol, 2,4-dimethyl-2,4-pentanediol, 2,2-diethyl-1,4-butanediol, 2-propyl-1,3-butanediol, 5-methyl-1,2-hexanediol, 2-ethyl-1,3-hexanediol, 2-tertbutyl-3,3,4,4-tetramethyl-1,2-pentanediol, 4-methyl-1,4-hexanediol, 1,6-hexanediol, 3,3-dimethyl-1,6-hexanediol, 2,4-dimethyl-3-hexene-2,5-diol, 1,4-, 2,3-, 2,4-, 2,5- or 3,4-hexanediol, 4-ethyl-3-methyl-2,4-heptanediol, 1,2-, 1,3-, 1,4-, 1,8-, 2,4-, 2,7-, or 4,5-octanediol, 2,4,4,5,5,7-hexamethyl-3,6-octanediol, 2,7-dimethyl-4-octene-2,7-diol, 2-butyl-4-ethyl-3-methyl-1,3-octanediol, 1,9-nonanediol, 1,2- or 1,10-decanediol, 1,2- or 1,12-dodecanediol, 5,8-diethyl-6,7-dodecanediol, 9,10- or 1,12-octadecanediol, 1,9- or 1,11-undecanediol, 1,13-tridecanediol, 1,2-tetradecanediol, 1,2- or 1,16-hexanediol, 16-methyl-1,2-heptadecanediol, 1,2- or 1,12-octadecanediol, 2-methyl-1,2-propanediol, 2-butyl-2-ethyl-1,3-propanediol, 2,2-diethyl-1,3-propanediol, propanediol, 2-isobutyl-1,3-propanediol, 2-ethyl-1,3-butanediol, 2,2-diethyl-1,4-butanediol, 2,2,3,3-tetramethyl-1,4-butanediol, etc.

Examples of the presently useful aromatic or paraffinic-aromatic dipropiolates are those of o, m, or p-xylene-α,α'-diols, 3,6-dimethyl-o-xylene-α,α'-diol, α,α'-dimethyl-p-xylene-α,α'-diol, 1,6-diphenyl-1,6-hexanediol, 1,2-diphenyl-1,2-ethanediol, 1- or 2-phenyl-1,2-propanediol, 2-methyl-1-phenyl-1,2-propanediol, 2-di-o-tolylmethyl-1,3-propanediol, 2-methyl-3-phenyl-1,2-butanediol, 1,4- or 2,2-diphenyl-1,4-butanediol, 2,3-dimethyl-1,4-diphenyl-1,4-butanediol, 1,6- or 1,8-naphthalenedimethanol, α-, α³-mesitylenediol, o-benzene-diethanol, α,α'-dimethylhydrobenzoin, 2,3-dibenzylidene-1,4-butanediol, 1-phenyl-1,5-pentanediol, hydroquinone, resorcinol, pyrocatechol, 4-dodecylpyrocatechol, p,p'-biphenol, 2,2', 6,6'-tetraisopropyl-p,p'-biphenol, 1,8 or 1,2-naphthalenediol, 4,4''-p-terphenyldiol, etc.

Examples of the presently useful tripropiolates are those of glycerine, 2-(hydroxymethyl)-2-methylpropanediol, 1,2,3- or 1,2,4-butanetriol, 3-(hydroxymethyl)-1,5-pentanediol, 2-tert-butyl-1,2,5-pentanetriol, 1,3,4-, 1,3,5-, or 2,3,4-pentanetriol, 1,9,10-octadecanetriol, 1,3,5-benzenetrimethanol, 4-ethyl-1,4,3-heptanetriol, 1,2,5-, 1,2,6- or 2,3,4-hexanetriol, 6-phenyl-4-5,6-decanetriol, 1- or 2-phenyl-1,2,3-propanetriol, α',α³,α⁵-mesitylenetriol, phloroglucinol, pyrogallol, 1,2,4-benzenetriol, 2,4,6-trimethylphloroglucinol, etc.

Illustrative of the presently useful tetrapropiolates are those of erythritol, pentaerythritol, 1,2,3,6-hexanetetrol, 2,3,6,7 - tetramethyl - 2,3,6-7 - octanetetrol, 2,3,8,9 - tetramethyl-2,3,8-9-decanetetrol, 1,2,3,4- or 1,2,3,5-benzenetetrol, 1,2,4,5-benzenetetramethanol, etc.

Also useful as cross-linking agents for the polyols are the propiolates of alkyleneoxyalkylene or polyalkyleneoxyalkylene diols, triols, or tetrols. Owing to their ready availability and to the valuable properties of the polyols reacted therewith, the propiolates of di- or poly-alkyleneoxyalkylene glycols are of significant commercial importance. Such propiolates are compounds of the formula

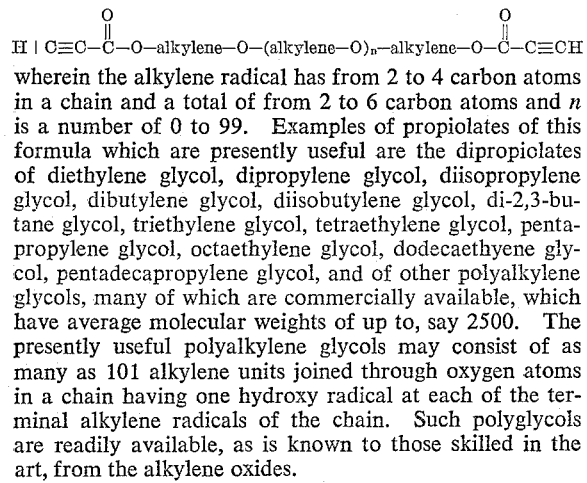

wherein the alkylene radical has from 2 to 4 carbon atoms in a chain and a total of from 2 to 6 carbon atoms and $n$ is a number of 0 to 99. Examples of propiolates of this formula which are presently useful are the dipropiolates of diethylene glycol, dipropylene glycol, diisopropylene glycol, dibutylene glycol, diisobutylene glycol, di-2,3-butane glycol, triethylene glycol, tetraethylene glycol, pentapropylene glycol, octaethylene glycol, dodecaethyene glycol, pentadecapropylene glycol, and of other polyalkylene glycols, many of which are commercially available, which have average molecular weights of up to, say 2500. The presently useful polyalkylene glycols may consist of as many as 101 alkylene units joined through oxygen atoms in a chain having one hydroxy radical at each of the terminal alkylene radicals of the chain. Such polyglycols are readily available, as is known to those skilled in the art, from the alkylene oxides.

The propiolates of alkyleneoxyalkylene or polyalkyleneoxyalkylene triols or tetrols which are presently useful are readily obtained by, e.g., reaction of propiolyl chloride or propiolic acid with the triol obtained by reacting glycerine with an alkylene oxide or with the tetrol obtained by reacting, say, 1,2,3,6-hexanetetrol or pentaerythritol with an alkylene oxide such as ethylene oxide or propylene oxide.

Valuable cross-linked products which are internally plasticized are obtained by reaction of the polyol with the di-, tri- or tetrapropiolate and a coreactant which may be a hydroxy compound or an amine. Use of the coreactant decreases the extent of cross-linking effected by the propiolate and thus adds to the toughness and flexibility of the insolubilized polyol. Incorporation of the coreactant into the polyol yields a product which is insolubilized as a result of some cross-linking, but which is frequently more resilient than that which is obtained by working with the propiolate in the absence of a coreactant.

The quantity of coreactant which is employed with the propiolate should be less than equimolar, i.e., the ratio of coreactant to dipropiolate, on a molar basis, should be less than 1:1. Advantageously there are employed mixtures containing, say, from 55% to 95% of the propiolate on a molar basis, with the balance being the coreactant. Within this range the optimum quantity of coreactant will be regulated by the properties desired in the final product as well as, of course, by the nature of the coreactant and of the propiolate. Generally, the wet tensile strength and wet burst strength retention values of the high-molecular weight cross-linked products, e.g., cellulose, increase with increase of coreactant concentration. However, for each new treating bath or emulsion the ratio of dipropiolate to coreactant should be experimentally arrived at with a view to the particular end to be served by the cross-linked product.

Hydroxy- or amino-containing coreactants of present utility may be any hydrocarbon hydroxy compound of from 1 to 18 carbon atoms or hydrocarbon primary or secondary amine of from 1 to 18 carbon atoms, e.g., an alkanol such as ethanol, propanol, isobutanol, dodecanol, octanol, oleyl alcohol or stearyl alcohol; an alkylene or alkyleneoxyalkylene glycol having from 2 to 4 carbon atoms in each alkylene radical, such as ethylene glycol, diethylene glycol, propylene glycol, or dipropylene glycol, a polyalkylene glycol having a molecular weight of from, say, 150 to 3,000, e.g., pentadecaethylene glycol, glycerol, pentaerythritol, 1,2-dimethyl-1,3-propanediol, phenol, o-, m- or p-cresol, o-, m- or p-xylenol, o-, m- or p-tert-butylphenol, resorcinol, pyrocatechol, α- or β-naphthol, cyclohexanol, 2,3-dimethylcyclopentanol, 4,4'-isopropylidenebisphenol, 4,4' - isopropylidenebiscyclohexanol, benzyl alcohol, 2-phenylethanol, 2-butenol, 1-pentyl-3-ol cinnamyl alcohol, 2-cyclohexenol, methylamine, dimethylamine, diethylamine, isopropanolamine, dipropylamine, hexylamine, methyldodecylamine, octadecylamine, aniline, N-methylaniline, N,N-diethylaniline, cyclohexylamine, o-, m- or p-toluidine, α- or β-naphthylamine, 2-penteneamine, 4-vinylaniline, benzylamine, etc.

Use of the coreactant with the propiolate generally does not require substantial variation of the reaction conditions hereinbefore described, i.e., whether or not the coreactant is used, the reaction is conducted in the presence or absence of diluents or solvents and in the presence or absence of basic catalysts at a temperature which may vary widely, say, at from −10° C. to 160° C., depending upon whether or not a catalyst is employed and upon the nature of the dipropiolate and of the polyol which is to be modified.

The invention is further illustrated by, but not limited to, the following examples.

*Example 1*

This example described the preparation of a polyvinyl alcohol which has been cross-linked with the dipropiolate of a polyethylene glycol of molecular weight 300.

An aqueous solution containing per 100 parts by weight of water, 4 parts by weight of polyvinyl alcohol, 0.4 part by weight of dipropiolate and 0.08 part by weight of N-methylmorpholine acetate was spread as a coating on a glass surface and heated in a 95° C. oven for 30 minutes. The resulting polymeric film was insoluble in, but somewhat softened by, boiling water when immersed therein. Cold water exerted only a slight softening effect on the film.

*Example 2*

A dispersion was prepared by stirring for 15 minutes at 75° C. a mixture consisting of 5 g. of a clear, 10% aqueous solution of polyvinyl alcohol and 0.05 g. of the dipropiolate of 2,2-dimethyl-1,3-propanediol. About 1 ml. of this dispersion was added to 5 ml. of a solution consisting of 0.2 g. of triethylenediamine in 20 ml. of ethylene glycol dimethyl ether. The soft coagulate which thus formed was dried for 15 minutes at 70° C. The resulting sponge-like product was resistant to boiling water, as shown by the fact that small pieces (2 mm. x 2 mm.) of the product neither dissolved nor adhered to each other upon boiling in water for 15 minutes.

*Example 3*

This example is like Example 1, except that methyl cellulose was used instead of polyvinyl alcohol. The cured film was highly softened by, but insoluble in, cold or boiling water.

*Example 4*

This example shows cross-linking, with the dipropiolate of 2,2-dimethyl-1,3-propanediol, of a polymeric triol known to the trade as Niax LG–56 and prepared by the reaction of glycerine with propylene oxide. Said polymeric triol had a molecular weight of 2862 by hydroxyl number determination and had the structure:

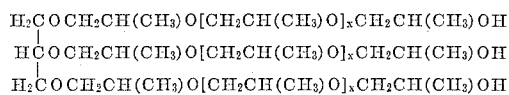

where $x$ denotes the appropriate degree of polymerization.

A mixture consisting of 2.0000 g. of said dipropiolate and 14.5708 g. of said polymeric triol was brought into solution by warming to 60° C. and then cooling to 25° C. To the solution there was added 0.48 g. of a catalyst solution which had been prepared by dissolving 0.4486 g. of triethylenediamine in 20 g. of dipropylene glycol.

After evacuating to deaireate, the mixture was poured into 3" x 3" x ¾₄" molds and after 38 minutes the resulting, very light yellow, clear gelled castings were cured by heating at about 65° C. for 8 hours under a 250 watt infrared bulb at a distance of 21". The rubbery products thus obtained were found to have Clash-Berg values of $T_f$ —64° C. and $T_{2000}$ —55.5° C. and an elongation of 455% at break.

Some of the gelled castings were allowed to cure by simply allowing them to stand overnight at room temperature. The rubbery products thus obtained resembled in every respect those which had been obtained by curing at 65° C. as described above.

*Example 5*

This example describes cross-linking of polyvinyl alcohol with the dipropiolate of 2,2-dimethyl-1,3-propanediol in the absence of a basic catalyst.

To 5.0 g. portions of a 10% aqueous solution of polyvinyl alcohol were respectively added 0.75 g. or 1.0 g. portions of a 10% solution of the dipropiolate in dimethyl sulfoxide. After thorough stirring the mixtures thus obtained were respectively cast into films on glass and heated for 45 minutes at 70° C. The films were then immered in boiling water for 30 minutes. At the end of that time the films were somewhat softened, but neither swollen nor otherwise affected. On the other hand, a "control" film cast from a mixture consisting of 5 ml. of 10% aqueous polyvinyl alcohol and 1 ml. of dimethyl sulfoxide and heated for 45 minutes at 70° C. dissolved rapidly in boiling water.

Cross-linked, insoluble films were similarly prepared by using dimethylformamide as solvent for the dipropiolate.

In these instances the solvent or solvent impurities exerted a catalytic effect on propiolate addition.

*Example 6*

This example shows insolubilization of starch with tetraethylene glycol dipropiolate.

A solution of 2 g. soluble starch, 0.6 g. dipropiolate and 0.065 g. methylmorpholine acetate in 60 ml. of water was evaporated to dryness and the residue heated at 100° C. for one hour. The residue was insoluble in cold or boiling water.

*Example 7*

In this example starch was reacted with the dipropiolate of p-xylene-α,α'-diol.

To a water-slurry of starch there was added an emulsion which had been prepared by dissolving the dipropiolate in dimethylbenzyl alcohol and adding the resulting solution to water in presence of an emulsifying agent. The emulsion was added in a quantity calculated to provide 1% by weight of the propiolate based on the weight of the dry starch. The pH of the whole was adjusted to 10.01 and the resulting mixture was heated at 90–95° C. for 15 minutes. The modified, cross-linked starch thus obtained was found to be a substantially water-resistant sizing agent for cellulosic papers.

*Example 8*

In this example glycerol was cross-linked with the dipropiolate of 2,2-dimethyl-1,3-propanediol.

In one experiment, there was prepared a solution consisting of 0.6201 g. of glycerol, 2.0821 g. of the dipropiolate, 10 ml. of dioxane and 1 ml. of a catalyst solution prepared by dissolving 0.0168 g. of triethylenediamine in 10 ml. of dioxane. The reaction became exothermic (65° C.) in about 5 minutes, and the reaction mixture became very viscous in 10 minutes and at the end of 16 minutes was suddenly converted into a clear, light yellow, firm and friable gel.

In another experiment, there was prepared a solution consisting of 0.9302 g. of glycerol, 2.0821 g. of the dipropiolate, 12 ml. of dioxane and 1 ml. of the above-described catalyst solution. The reaction became exothermic in about 7 minutes, but at the end of about 35 minutes at ambient temperature it was still only slightly viscous. Accordingly, it was heated to 80° C. and maintained at this temperature for 10 minutes, at the end of which time it was converted into the kind of gel which was obtained in the first experiment.

The above shows that the ratio of propiolate to the polyol is a material factor in the cross-linking reactions. The first experiment was conducted with a ratio of one triple bond of propiolate per hydroxy group of the glycerol, whereas in the second experiment there was employed a ratio of only two triple bonds per three hydroxy groups.

*Example 9*

Swatches (5" x 6") of unsized Indianhead cotton fabric were immersed in 300 ml. of acetone for 2 minutes, drained and dried, subsequently conditioned for 2 days by maintaining over saturated aqueous sodium bromide, and finally weighed in tared, capped bottles. These were then immersed, respectively, in one of the following treating solutions:

(A) 0.500 g. of the dipropiolate of 2,2-dimethyl-1,3-propanediol, 0.4666 g. of a mixture of $C_{12}$–$C_{16}$ aliphatic alcohols having an average molecular weight of 194.3 and 50 ml. of acetone.

(B) 0.50 mole of the dipropiolate of 2-ethyl-2-butyl-1,3-propanediol and 50 ml. of acetone.

After pressing between paper towels and air drying for 2 hours, the treated swatches were respectively placed in 8 oz. jars which each contained 0.5 ml. of N-methylmorpholine, and the jars were capped, and heated in an oven for 1 hour at 60° C. The swatches were then aired for 2 hours and conditioned over saturated sodium bromide. In order to remove any possibly unreacted material the swatches were washed three times with acetone and then again air-dried and conditioned over sodium bromide for 24 hours. At the end of this time the weight of the swatch which had been treated with the solution (A) had increased from 3.1089 g. to 3.1869 g., and that which had been treated with solution (B) had increased from 3.2456 g. to 3.4036 g. Both swatches were water-repellant, and both swatches were as soft and resilient as the untreated fabric. Retention of the water-repellant property was tested by washing the swatches in the launderometer for 10 minutes at 60° C., using an 0.20% aqueous solution of a detergent consisting by weight of 15% of a polyethylene glycol ether of a mixture of higher ($C_{12}$–$C_{18}$) fatty alcohols, 40% of a mixture of sodium tripolyphosphate and sodium tetrapyrophosphate, 20% sodium ash and 25% sodium silicate. The washed swatches were rinsed with water and air-dried at room temperature. Testing of the dried swatches for water-repellancy by water-spraying for 10 seconds with an air-powered spray gun showed them to be water-repellant.

Subsequent testing of the swatch which had been treated with solution (B) showed the water-repellancy thereof to be unimpaired even after 40 minutes of washing in the launderometer as described above.

*Example 10*

This example describes the cross-linking addition of the dipropiolate of 2,2-dimethyl-1,3-propanediol and an ethylene-vinyloxyethanol copolymer containing 15.8% copolymerized vinyloxyethanol.

The copolymer (10.08 g.) was melted by heating it to 120° C. and 4.04 g. of the dipropiolate was added thereto. Whatman No. 1 chromatographic paper tape, 1.5" wide, was then coated on one side with the resulting melt (135° C.). The coated tape was cut into 6.5" strips, and the strips were suspended in a gallon jar containing 2 ml. of N-methylmorpholine and allowed to remain in the capped jar for 20 minutes. They were then hung in a 115° C. oven for 15 minutes. The light tan coated strips thus obtained could be folded and creased repeatedly without evidence of cracking of the soft, flexible coating. Immersion of the coated strips in toluene for 15 minutes at 110° C. did not remove the coating from the strips, although untreated ethylene-vinyloxyethanol copolymer coated on paper dissolved instantly in toluene at this temperature.

In a series of experiments, the proportion of ethylene-vinyloxyethanol copolymer to dipropiolate was varied in order to determine the optimum ratio. The following melts were prepared at 120° C. on a chrome-plated, heated surface:

(1) 2 g. of copolymer plus 0.8 g. dipropiolate
(2) 2 g. of copolymer plus 0.2 g. dipropiolate
(3) 2 g. of copolymer plus 0.05 g. dipropiolate
(4) 2 g. of copolymer plus no dipropiolate The dipropiolate employed was that of 2,2-dimethyl-1,3-propanediol.

Paper tapes (Whatman No. 1 chromatographic, 1.5" x 10") were drawn through the melts, pressing and doctoring with a glass rod on both sides of the tape to obtain thorough impregnation. The tapes were hung in a 12" x 12" x 4" closed chamber and nitrogen containing vapors of N-methylmorpholine entrained therein was passed into the chamber for 20 minutes. The tapes were then hung in a 140° C. oven for 3 minutes. Tape No. 1 showed some discoloration, whereas tapes 2 and 3 were colorless. In order to test change in solubility characteristics, 1" portions were clipped from each of the coated tapes and immersed in 200 ml. of boiling toluene for 30 seconds. At the end of that time examination of the papers showed that the portions of tape which had been treated with melts (1)–(3) were still coated, whereas all of the coating had been dissolved from the tape which had been treated with the control, i.e., melt (4). It is thus evident that the cross-linking treatment with the dipropiolate had insolubilized the ethylene-vinyloxyethanol copolymer.

*Example 11*

This example shows cross-linking of paper with a dipropiolate applied as a solution in acetone and in the presence or absence of an aliphatic di- or polyhydroxy compound as a coreactant.

Sheets (6" x 10") of Nashua P-3 electrical marking paper were respectively immersed for one minute in one of the following treating solutions:

(A) 0.173 g. of the dipropiolate of 2,2-dimethyl-1,3-propanediol, 0.827 g. of a polypropylene glycol having a molecular weight of 1986 and 100 ml. of acetone.

(B) 1.513 g. of the dipropiolate of 2,2-dimethyl-1,3-propanediol, 0.487 g. of dipropylene glycol and 100 ml. of acetone.

(C) 1.00 g. of the dipropiolate of ethylene glycol and 100 ml. of acetone.

The treated sheets were allowed to air dry for about 30 minutes and hung at room temperature in a 12" x 15" x 16.5" chamber through which there was passed for 30 minutes a steady stream of nitrogen carrying entrained therein vapors of N-methylmorpholine that had been picked up by passing the nitrogen through the N-methylmorpholine. The sheets, freely hung, were then cured in a convection oven at 60° C. for one hour. The cured sheets were subsequently immersed in acetone for about one minute on three consecutive occasions, using fresh acetone each time. After air-drying at ambient temperature, they were conditioned for about one week at 25° C. and 50% relative humidity.

The treated papers were then submitted to evaluation employing the following procedures of the American Society for Testing Materials: D829–4B for wet and dry tensile strength, D624–54 for wet and dry tear strength, D774–46 for wet and dry Mullen bursting strength, and D643–4B for folding endurance. The evaluations were made by the setting of the longer dimensions of the paper in the direction of the machine. The tensile strength, tearing strength and bursting strength of the wet, treated papers were compared to those of the dry, treated papers and reported as wet percent retention based on self; and these properties of the wet, treated papers were also compared to those of the untreated paper, i.e., the "control" and reported as wet percent retention based on control. The following evaluation data were obtained:

| | Dry | Wet | Wet percent retention | | Percent wt. increase |
|---|---|---|---|---|---|
| | | | Self | Control | |
| Paper treated with (A): | | | | | |
| Tensile strength, p.s.i. | 2,625 | 275 | 10 | 11 | 0.97 |
| Percent elongation | 4.0 | 2.1 | | | |
| Tear strength, p.s.i. | 115 | 40 | 35 | 40 | |
| Burst strength, p.s.i. | 5.1 | 1.5 | 29 | 31 | |
| Folding endurance | 7 | | | | |
| Paper treated with (B): | | | | | |
| Tensile strength, p.s.i. | 3,345 | 1,035 | 31 | 40 | 1.91 |
| Percent elongation | 4.2 | 4.7 | | | |
| Tear strength, p.s.i. | 95 | 135 | 142 | 135 | |
| Burst strength, p.s.i. | 6.9 | 3.5 | 51 | 73 | |
| Folding endurance | 23 | | | | |
| Paper treated with (C): | | | | | |
| Tensile strength, p.s.i. | 3,235 | 865 | 27 | 34 | 1.91 |
| Percent elongation | 4.5 | 4.1 | | | |
| Tear strength, p.s.i. | 105 | 120 | 110 | 120 | |
| Burst strength, p.s.i. | 5.9 | 3.3 | 56 | 69 | |
| Folding endurance | 14 | | | | |
| Control (untreated paper): | | | | | |
| Tensile strength, p.s.i. | 2,565 | 220 | 9 | 9 | 0.0 |
| Percent elongation | 4.4 | 2.3 | | | |
| Tear strength, p.s.i. | 100 | 30 | 30 | 30 | |
| Burst strength, p.s.i. | 4.8 | 1.6 | 33 | 33 | |
| Folding endurance | 10 | | | | |

It will be noted from the above that concentration of the treating solutions is related to the improvement of both dry and wet properties. The papers which were treated with (B) or (C) both had a weight increase of 1.91%, and both possessed properties which were better than those of the paper which had been treated with (A) and in which the weight increase was only 0.97%.

*Example 12*

This example shows cross-linking of paper with the dipropiolate of ethylene glycol in aqueous emulsion in the presence or absence of a hydroxy compound as coreactant.

Whatman No. 1, chromatographic paper tape, 1.5" wide, was cut into 30" strips and the strips were impregnated by drawing them between rolls in one of the following baths:

(A) 1.16 g. of dipropiolate, 0.05 g. of dodecylphenol decaethylene glycol, 0.05 g. of sodium N-methyl-N-tallow acid taurate (Igepon TE 42), 0.08 g. of N-methylmorpholine acetate and 99 g. of water.

(B) 1.16 g. of dipropiolate, 0.05 g. of dodecylphenol decaethylene glycol, 0.05 g. of diisobutylphenoxyethoxyethyl dimethyl benzyl ammonium chloride hydrate (Hyamine 1622), 0.08 g. of N-methylmorpholine acetate and 99 g. of water.

(C) 1.16 g. of dipropiolate, 0.005 g. dodecylphenol decaethylene glycol, 0.005 g. of sodium tridecylbenzenesulfonate, 0.08 g. of N-methylmorpholine acetate and 99 g. of water.

(D) 1.16 g. of the dipropiolate, 0.234 g. of dipropylene-glycol, 0.05 g. of dodecylphenol decaethylene glycol, 0.05 g. of Igepon TE 42 (see A, above), 0.08 g. of N-methylmorpholine acetate and 99 g. of water.

(E) 1.16 g. of the dipropiolate, 0.162 g. of glycerol, 0.05 g. of dodecylphenol decaethylene glycol, 0.05 g. of Igepon TE 42 (see A, above), 0.08 g. of N-methylmorpholine acetate and 99 g. of water.

(F) 1.16 g. of the dipropiolate, 0.284 g. of starch, 0.05 g. of dodecylphenol decaethylene glycol, 0.05 g. of Igepon TE 42 (see A, above), 0.08 g. of N-methylmorpholine acetate and 99 g. of water.

(G) 1.16 g. of the dipropiolate, 0.165 g. of phenol, 0.05 g. of dodecylphenol decaethylene glycol, 0.05 g. of Igepon TE 42 (see A, above), 0.08 g. of N-methylmorpholine acetate and 99 g. of water.

After draining, the impregnated paper tapes were cured as follows:

(A)—treated: 26° C. for 1 hr., then 150° C. for 5 min.;
(B)—treated: 26° C. for 1.5 hr., then 140° C. for 5 min.;
(C)—treated: 80° C. for 15 min.;
(D), (E), (F), or (G)—treated: 26° C. for 1.5 hours, 150° C. for 5 min.

The cured tapes were then evaluated as described in Example 11. The following results were obtained:

|  | Dry | Wet | Wet percent retention | |
|---|---|---|---|---|
|  |  |  | Self | Control |
| Paper treated with (A): |  |  |  |  |
| Tensile strength, p.s.i. | 1,370 | 700 | 51 | 55 |
| Percent elongation | 2.3 | 3.7 |  |  |
| Burst strength, p.s.i. | 8.2 | 6.2 | 76 | 69 |
| Paper treated with (B): |  |  |  |  |
| Tensile strength, p.s.i. | 1,495 | 800 | 59 | 67 |
| Percent elongation | 2.3 | 4.2 |  |  |
| Burst strength, p.s.i. | 8.1 | 6.8 | 84 | 76 |
| Paper treated with (C): |  |  |  |  |
| Tensile strength, p.s.i. | 1,280 | 680 | 53 | 54 |
| Percent elongation | 2.3 | 4.6 |  |  |
| Burst strength, p.s.i. | 10.3 | 6.0 | 58 | 67 |
| Paper treated with (D): |  |  |  |  |
| Tensile strength, p.s.i. | 1,310 | 560 | 43 | 44 |
| Percent elongation | 2.3 | 3.7 |  |  |
| Burst strength, p.s.i. | 8.3 | 6.0 | 72 | 67 |
| Paper treated with (E): |  |  |  |  |
| Tensile strength, p.s.i. | 1,250 | 570 | 46 | 45 |
| Percent elongation | 2.1 | 4.0 |  |  |
| Burst strength, p.s.i. | 7.4 | 5.4 | 73 | 60 |
| Paper treated with (F): |  |  |  |  |
| Tensile strength, p.s.i. | 1,395 | 560 | 40 | 44 |
| Percent elongation | 2.2 | 3.3 |  |  |
| Burst strength, p.s.i. | 7.9 | 5.6 | 71 | 62 |
| Paper treated with (G): |  |  |  |  |
| Tensile strength, p.s.i. | 1,325 | 645 | 49 | 51 |
| Percent elongation | 2.3 | 3.9 |  |  |
| Burst strength, p.s.i. | 8.3 | 5.7 | 69 | 63 |
| Untreated paper (control): |  |  |  |  |
| Tensile strength, p.s.i. | 1,270 | 18 | 1.4 | 1.4 |
| Percent elongation | 2.7 | 1.1 |  |  |
| Burst strength, p.s.i. | 9 | 1.6 | 18 | 18 |

*Example 13*

This example describes treatment of paper in an emulsion comprising the dipropiolate of ethylene glycol but not the catalyst, and subsequently exposing the treated paper to volatilized N-methylmorpholine as catalyst.

An emulsion bath was prepared by shaking 1.0 g. of the dipropiolate in 99 ml. of water containing 0.1 g. of dodecylphenol decaethylene glycol and 0.05 g. of sodium tridecylbenzenesulfonate. Strips of Whatman No. 1, chromatographic paper tape, 30″ long and 1.5″ wide, were impregnated by drawing them between rolls in the bath. They were dried at 25° C. for 150 minutes and then hung for 15 minutes at 25° C. in a 12″ x 15″ x 16.5″ chamber through which there was steadily passed a stream of nitrogen which had been passed through N-methylmorpholine and which thus had vapors of N-methylmorpholine entrained therein. The treated tapes after curing at 80° C. for 15 minutes thus obtained were evaluated as described in Example 11. The following results were obtained:

|  | Dry | Wet | Wet percent retention | |
|---|---|---|---|---|
|  |  |  | Self | Control |
| Tensile strength, p.s.i. | 1,385 | 780 | 56 | 61 |
| Percent elongation | 2.7 | 5.0 |  |  |
| Burst strength, p.s.i. | 10.9 | 7.7 | 71 | 85 |

*Example 14*

A strip of Whatman No. 1 filter paper was dipped in a solution of 1.0 g. of the dipropiolate ester of tetraethylene glycol and 0.08 g. of N-methylmorpholine acetate in 100 ml. of water. The paper was dried in a 105° C. oven for 30 minutes, then soaked in water for 5 minutes. The treated wet paper could be vigorously rubbed with the fingers without abrading the surface and showed a high degree of tensile and tearing strength compared to a wet untreated piece of the same paper.

*Example 15*

A 15 cm. disc of Whatman No. 1 filter paper was saturated by immersing it into 33 ml. of a 1% aqueous solution of the dipropiolate of tetraethylene glycol to which had been added 0.42 ml. of an 0.4 molar aqueous solution of N-methylmorpholine acetate. It was then drained, air-dried and placed in a 100° C. oven for 15 minutes. The treated paper thus obtained showed substantial improvement in wet-strength.

In another experiment a 15 cm. disc of the same kind of filter paper was saturated by immersing it into a 1% aqueous solution of the same dipropiolate. After draining and air-drying, the disc was maintained for 5 minutes in a chamber through which there was passed a stream of nitrogen containing volatilized N-methylmorpholine entrained therein, and it was then air-dried for 30 minutes and finally maintained in a 100° C. oven for 15 minutes. Improvement in wet-strength of the paper by this treatment was likewise obtained.

*Example 16*

A 2″ x 5″ strip of Whatman No. 1 filter paper was immersed in a bath consisting of 10 ml. of a 2.0% aqueous solution of the dipropiolate of a polyethylene glycol having an average molecular weight of 300 and 0.125 ml. of an 0.4 molar aqueous solution of N-methylmorpholine. The thoroughly wetted paper was hung in a 105° C. forced air oven for 10 minutes. Evaluation of the wet-strength of the resulting, treated paper showed it to be materially improved over that of the untreated paper.

*Example 17*

Strip (1.5″ x 2″) of Whatman No. 1 filter paper were impregnated with a solution consisting of the dipropiolate of p,p′-biphenol, 100 ml. of acetone and 1.25 ml. of an 0.4 molar solution of N-methylmorpholine in acetone. After heating in an oven at 100° C. for 5 minutes, the treated strips showed improved wet strength and wet rub resistance.

*Example 18*

The following solutions were used respectively to impregnate 1.5″ x 2″ strips of Whatman No. 1 filter paper:

(A) 0.125 g. of the tripropiolate of 2-hydroxymethyl-1,3-propanediol in 12.5 ml. of acetone.

(B) same as (A) plus 0.48 ml. of an 0.4 molar solution of N-methylmorpholine acetate.

The strip which was impregnated with solution (A) was air-dried at 26° C. for 10 minutes, then exposed for one minute to vapors of N-methylmorpholine entrained by nitrogen, and finally heated for two minutes in a 100° C. forced air oven. In order to test the treated paper, it was soaked in water at room temperature for 5 minutes. At the end of this time the paper did not wet out and the strength characteristics of the soaked paper were significantly greater than those of the untreated paper.

The strip which was impregnated with solution (B) was air-dried at 26° C. for 10 minutes and maintained at 100° C. in a forced air oven for 15 minutes. The paper thus obtained was found to wet out, but very slowly, and its wet strength was greater than that of the untreated paper.

The cross-linked paper products which are provided by the present invention are well stabilized to those dimensional changes which normally occur on the absorption and desorption of water. Tensile strength, bursting strength and elasticity in the wet state are materially increased. The cross-linked paper thus can be used for a variety of purposes where moisture is liable to be encountered and where disintegration by moisture is to be avoided. Thus, it can be used for wrapping moist foods, for posters, wall-paper, maps, cement bags, etc. The cross-linked paper is particularly valuable in the production of tissues and thin sheetings.

When used with normally water-soluble, synthetic polymers, the present process produces tough, water-insoluble products which can be extruded or spun into fibers or employed in the preparation of lacquers or water-emulsion coatings.

Products obtained from the tri- or tetraaliphatic polyols, e.g., glycerine or pentaerythritol, are resinous materials of high utility in the preparation of moldings, castings and laminates. Moldings and castings from such cross-linked products are transparent, substantially colorless, tough products which are characterized by good dimensional stability and resistance to heat and moisture.

The above examples and description are intended to be illustrative only. Any modification of or variation therefrom which conforms to the spirit of the invention is intended to be included within the scope of the claims.

What we claim is:

1. The cross-linked addition product of an aliphatic polyol, having at least three hydroxy groups and containing only carbon, hydrogen and oxygen, and an ester of propiolic acid having the formula

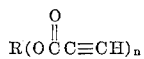

wherein R is selected from the class consisting of paraffinic, aromatic and paraffinic-aromatic hydrocarbon radicals of from 2 to 18 carbon atoms and alkyleneoxyalkylene and polyalkyleneoxyalkylene radicals having from 2 to 4 carbon atoms in the chain of the alkylene radical and a total of from 2 to 6 carbon atoms in the alkylene radical, a total of from 1 to 100 oxygen atoms and a total of from 2 to 101 alkylene radicals, said R being linked through diverse carbon atoms thereof to the remainder of the molecule of which it forms a part, and $n$ is a number of 2 to 4, said cross-linked addition product having been prepared in the presence of a basic catalyst at a temperature of from $-10°$ C. to $160°$ C.

2. The product defined in claim 1, further limited in that the polyol is cellulose.

3. The cross-linked addition product of cellulose and a diester of the formula

wherein R is an alkylene radical of from 2 to 18 carbon atoms and is linked through diverse carbon atoms thereof to the remainder of the molecule of which it forms a part, said cross-linked addition product having been prepared in the presence of a basic catalyst at a temperature of from $-10°$ C. to $160°$ C.

4. The cross-linked addition product of cellulose and a mixture of a diester of the formula

wherein R is an alkylene radical of from 2 to 18 carbon atoms and is linked through diverse carbon atoms thereof to the remainder of the molecule of which it forms a part and an alkyleneoxyalkylene glycol having from 2 to 4 carbon atoms in each alkylene radical, said cross-linked addition product having been prepared in the presence of a basic catalyst at a temperature of from $-10°$ C. to $160°$ C.

5. The cross-linked addition product of polyvinyl alcohol and a diester of the formula

wherein R is a bivalent hydrocarbon radical of from 2 to 18 carbon atoms and is linked through diverse carbon atoms thereof to the remainder of the molecule of which it forms a part, said cross-linked addition product having been prepared in the presence of a basic catalyst at a temperature of from $-10°$ C. to $160°$ C.

6. The cross-linked addition product of cellulose and a dipropiolate of the formula

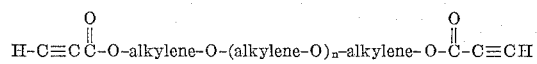

wherein the alkylene radical has from 2 to 4 carbon atoms in the chain and a total of from 2 to 6 carbon atoms and $n$ is a number of 0 to 99, said cross-linked addition product having been prepared in the presence of a basic catalyst at a temperature of from $-10°$ C. to $160°$ C.

7. The cross-linked addition product of cellulose and the dipropiolate of 2,2-dimethyl-1,3-propanediol, said cross-linked addition product having been prepared in the presence of a basic catalyst at a temperature of from $-10°$ C. to $160°$ C.

8. The cross-linked addition product of polyvinyl alcohol and the dipropiolate of 2,2-dimethyl-1,3-propanediol, said cross-linked addition product having been prepared in the presence of a basic catalyst at a temperature of from $-10°$ C. to $160°$ C.

9. The cross-linked addition product of cellulose and the dipropiolate of ethylene glycol, said cross-linked addition product having been prepared in the presence of a basic catalyst at a temperature of from $-10°$ C. to $160°$ C.

10. The cross-linked addition product of cellulose and the dipropiolate of a polyethylene glycol wherein said glycol has an average molecular weight of up to 2500, said cross-linked addition product having been prepared in the presence of a basic catalyst at a temperature of from $-10°$ C. to $160°$ C.

11. A cellulosic paper having hydroxy groups of the cellulose reacted with a dipropiolate of the formula

wherein R is an alkylene hydrocarbon radical of from 2 to 18 carbon atoms and is linked through diverse carbon atoms thereof to the remainder of the molecule of which it forms a part, said reaction of the cellulosic paper and said dipropiolate having been conducted in the presence of a basic catalyst at a temperature of from $-10°$ C. to $160°$ C.

References Cited by the Examiner

UNITED STATES PATENTS 2,524,399 10/50 Schoene et al. _____ 260—231
2,602,789 7/52 Schwartz et al. _____ 260—226

(Other references on following page)

UNITED STATES PATENTS 3,031,435 4/62 Tesoro _____ 8—120
3,082,242 3/63 Miller et al. _____ 260—486

OTHER REFERENCES

Frick et al.: Chem. Modification of Cotton by Reaction with Activated Olefinic Compounds. In Textile Research Journal, vol. 27, pp. 92–99, February 1957.

Piganiol: Acetylene Homologs and Derivatives, p. 180, Mapleton House, pub., New York, 1950.

WILLIAM H. SHORT, *Primary Examiner.*

A. H. WINKELSTEIN, *Examiner.*